(12) United States Patent
Kimura

(10) Patent No.: US 7,398,370 B2
(45) Date of Patent: Jul. 8, 2008

(54) INFORMATION PROCESSING APPARATUS AND METHOD

(75) Inventor: Tetsuro Kimura, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 421 days.

(21) Appl. No.: 11/159,288

(22) Filed: Jun. 23, 2005

(65) Prior Publication Data

US 2005/0240598 A1    Oct. 27, 2005

Related U.S. Application Data

(63) Continuation of application No. 09/944,086, filed on Sep. 4, 2001, now Pat. No. 6,973,487.

(30) Foreign Application Priority Data

Sep. 20, 2000    (JP)    ............... P2000-286066

(51) Int. Cl.
*G06F 12/06* (2006.01)
(52) U.S. Cl. .............. 711/203; 709/221; 709/217; 709/230; 711/214
(58) Field of Classification Search .......... 709/221, 709/217, 225, 230, 245; 710/220; 370/254; 711/203, 211, 214
See application file for complete search history.

(56) References Cited

U.S. PATENT DOCUMENTS

| 6,105,100 A | 8/2000 | Dean et al. |
| 6,490,617 B1 | 12/2002 | Hemphill et al. |
| 6,522,654 B1 | 2/2003 | Small |
| 6,587,876 B1 | 7/2003 | Mahon et al. |
| 6,614,788 B1 | 9/2003 | Martin et al. |
| 2002/0188657 A1 | 12/2002 | Traversat et al. |
| 2003/0005100 A1 | 1/2003 | Barnhard et al. |

OTHER PUBLICATIONS

Harold, Chapter 18 entitled "Remote Method Invocation" of "Java Network Programming," Second Edition, O'Reilly & Associates, Inc. (2000).

"Java™ Remote Method Invocation Specification," Java™ 2SDK, v1.3.0 pp. 1-19 (Dec. 1999).

Arnold et al., Chapter 17 entitled "Standard Packages," The Java Programming Language, Second Edition (1999).

*Primary Examiner*—Pierre-Michel Bataille
(74) *Attorney, Agent, or Firm*—Finnegan, Henderson, Farabow, Garrett & Dunner, L.L.P.

(57) ABSTRACT

In an information processing apparatus, a program processing unit executes a program described as an object-oriented language executed by a platform-independent machine language. A monitor unit monitors a change of a network address of the information processing apparatus. A reference provision unit provides a new network address of the information processing apparatus for another information processing apparatus when said monitor unit detects the change of the network address of the information processing apparatus.

9 Claims, 12 Drawing Sheets

INFORMATION PROCESSING APPARATUS AND METHOD

This is a continuation of application Ser. No. 09/944,086, filed Sep. 4, 2001, now U.S. Pat. No. 6,973,487 which is incorporated herein by reference.

CROSS-REFERENCE TO RELATED APPLICATIONS

This application is based upon and claims the benefit of priority from the prior Japanese Patent Application PH2000-286066, filed on Sep. 20, 2000; the entire contents of which are incorporated herein by reference.

FIELD OF THE INVENTION

The present invention relates to information processing apparatus and method for executing distributed information processing in a Java (Registered trademark of Sun Microsystems INC.) executive environment.

BACKGROUND OF THE INVENTION

Recently, by development of program executive environment Java (Ken Arnold, James Gosling, "The Java Programming Language, Second Edition,") independent from a platform, a system to cooperate various kinds of information equipments with Java is greatly taken into consideration. In case of implementing a distributed application by Java, in general, a communication mechanism, "Remote Method Invocation (RMI)", is utilized as communication means (Troy Bryan Downing, "RMI: Developing Distributed Java Applications with Remote Method Invocation and Serialization," IDG Books World Wide, Inc. 1998). RMI is an extended version of method invocation mechanism between objects in Java. RMI is a simple and powerful communication mechanism that conceals a complicated communication processing. However, Java and RMI cannot adjust to a change in the IP address (Hereinafter, called "network address") of the executive computer (host). The following two problems then arise.

(1) When a client connects to a server, in RMI, the connection is executed using information "remote reference". The remote reference includes the network address (IP address) and a port number of the computer executing a server program. For example, when the computer is activated (power is turned on) and the service is disclosed, the server program creates the remote reference. In this case, the network address at the creating time is written in the remote reference. If the network address is changed, a mechanism to update the remote reference is not prepared. Accordingly, after the network address changes because the computer moved, the remote reference distributed by the server program (to register to a directory service program) includes the network address before the computer moved. After a client program receives this remote reference, the client program tries to connect to the server using the old network address. The client program cannot connect to the server having the new network address.

(2) In the RMI, a Java object is sent and received between the server and the client. In the Java program receiving side, a class file corresponding to received Java object is necessary. If the Java program already has the class file, the Java program executes processing of received Java object using the class file. However, if the Java program does not have the class file, the Java program refers to information of supply source of the class file annotated to the Java object, and downloads the class file from the supply source. After that, the Java program executes processing of the Java object. The information of supply source of class file annotated to the Java object is called "codebase". The codebase is indicated by Uniform Resource Locator (URL) format. In the same way as the remote reference, the codebase is static, and the codebase does not have an update mechanism in cooperation with a change of the network address. Accordingly, if a computer whose network address dynamically changes such as network moving is the supply source of a class file (in case that HTTP server is executed on a server machine), the codebase is not updated and a program at the receiving side cannot normally operate.

BRIEF SUMMARY OF THE INVENTION

It is an object of the present invention to provide an information processing apparatus and method for, even if the network address of a terminal including Java program dynamically changes, communicating to another terminal including Java program by updating the remote reference and the codebase.

According to an aspect of the present invention, there is provided an information processing apparatus, comprising: a program processing unit configured to execute a program described as an object-oriented language executed by a platform-independent machine language; a monitor unit configured to monitor a change of a network address of the information processing apparatus; and a reference provision unit configured to provide a new network address of the information processing apparatus for another information processing apparatus when said monitor unit detects the change of the network address of the information processing apparatus.

Further in accordance with another aspect of the present invention, there is also provided an method in an information processing apparatus, comprising: executing a program described as an object-oriented language executed by a platform-independent machine language; monitoring a change of a network address of the information processing apparatus; and providing a new network address of the information processing apparatus for another information processing apparatus when the change of the network address of the information processing apparatus is detected.

Further in accordance with another aspect of the present invention, there is also provided a computer program product, comprising: a computer readable program code embodied in said product for causing an information processing apparatus, said computer readable program code having: a first program code to execute a program described as an object-oriented language executed by a platform-independent machine language; a second program code to monitor a change of a network address of the information processing apparatus; and a third program code to provide a new network address of the information processing apparatus for another information processing apparatus when the change of the network address of the information processing apparatus is detected.

DETAILED DESCRIPTION OF THE INVENTION

Figure 1:
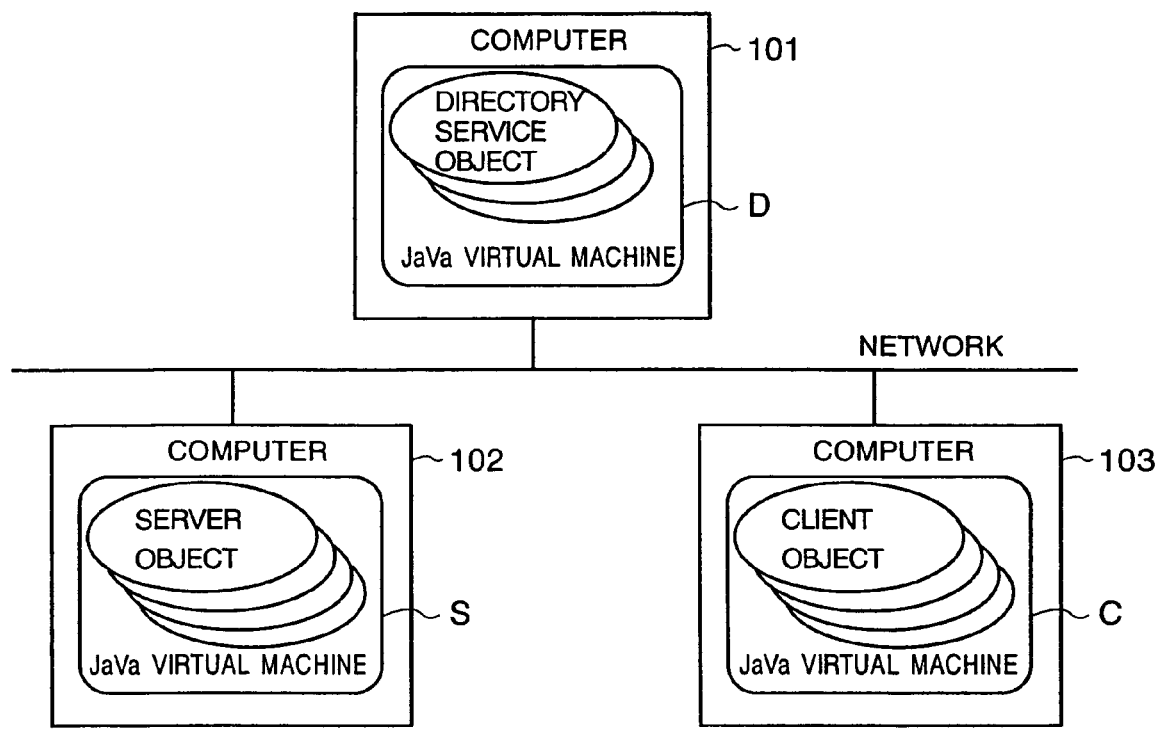
FIG. 1 is a component example of a distributed information processing system.

Hereinafter, various embodiments of the present invention will be explained by referring to the drawings. FIG. 1 is a component example of a distributed information processing system. A plurality of computers (In FIG. 1, three computers) 101, 102 and 103 are connected through a network such as the Internet. Each computer includes at least one executive environment (Java virtual machine) executing a program described by Java. Java is an object-oriented language executed by machine language independent from a platform. The distributed information processing is realized by communication between Java programs using RMI.

The distributed information processing using RMI of Java requires a server program providing a service, a client program utilizing the service, and a directory service program mediating between the server and the client. In FIG. 1, the server program, the client program and the directory service program are respectively programs executed by Java virtual machine S, C, D, on different computers 102, 103, 101. In this case, different Java virtual machines on the same computer may be used.

The directory service program allows a client program to detect the server program. The directory service program detects the server program using a key such as a service name or a service attribute requested from the client program. For example, a program "rmiregistry", included in development environment of Java, and a program "Lookup Server" of Jini (K. Arnold, B. O'Sullivan, R. W. Scheifler, J. Waldo, and A. Wollrath, "The Jini Specification," Addison-Wesley, 1999), advocated by Sun Microsystems INC., are example directory service programs.

The server program receives a service request from the client program on other Java virtual machine as a format of remote method calling, and sends back the service result as a returned value of the method. In case of beginning the service provision, the server program writes a service name and a service attribute provided by the server program, and information necessary for connecting to the server program, in an object file explained afterwards. The information is called "a remote reference". The information includes a network address (network layer address, i.e., IP address), a port number, and an object identifier. The server program registers the object file in the directory service program.

The client program sends a request using the remote method calling to the server program, and receives a response (service result) from the server program. In case of accessing the service, the client program must know a location of the server program operating on the network. Accordingly, the client program first connects to the directory service program, and retrieves desired server program using a key such as a service name or a service attribute. In case of succeeding in the retrieval, the client program can acquire a remote reference registered in the directory service program. The client program connects to the server program using the remote reference, and receives the service provision from the server program.

Figure 2:
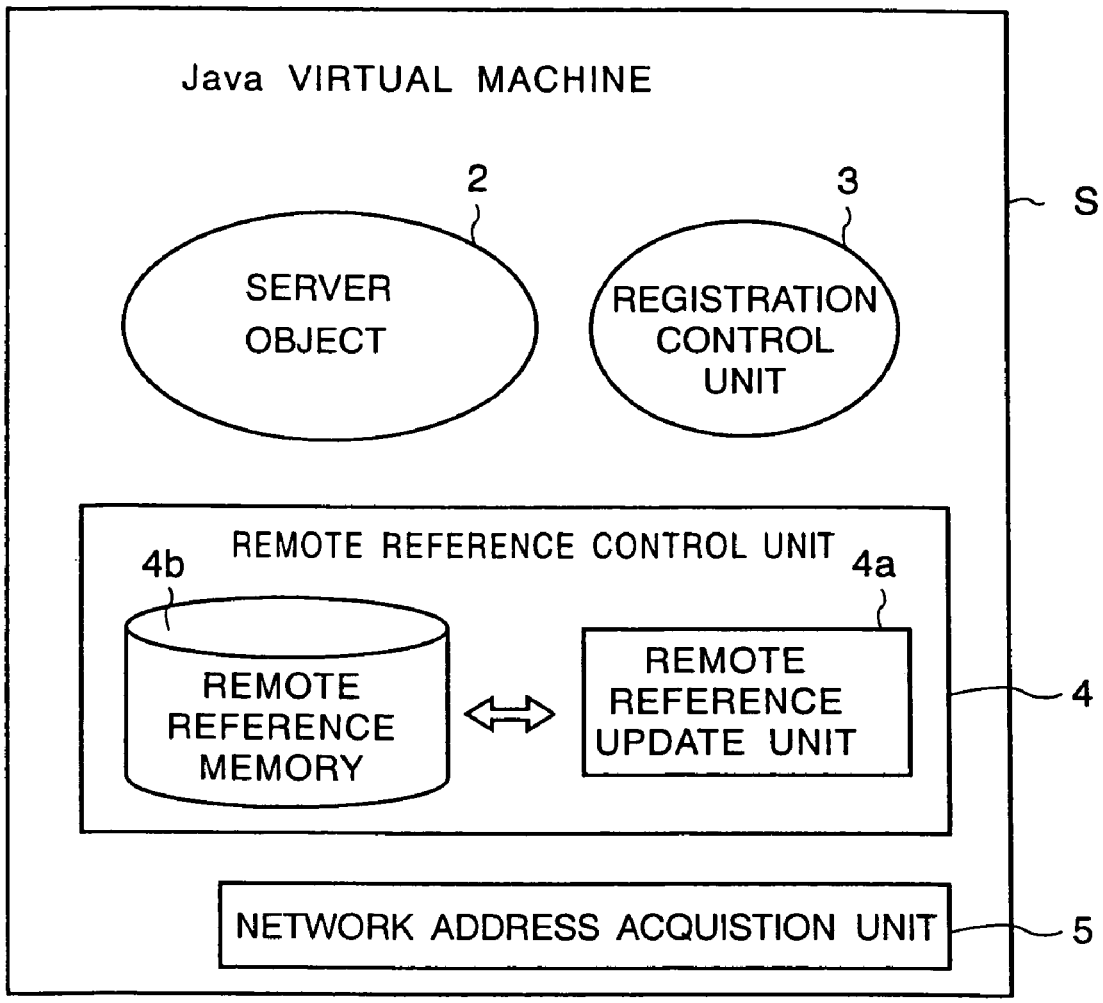
FIG. 2 is a block diagram of a virtual machine executing a conventional server program.
Figure 3:
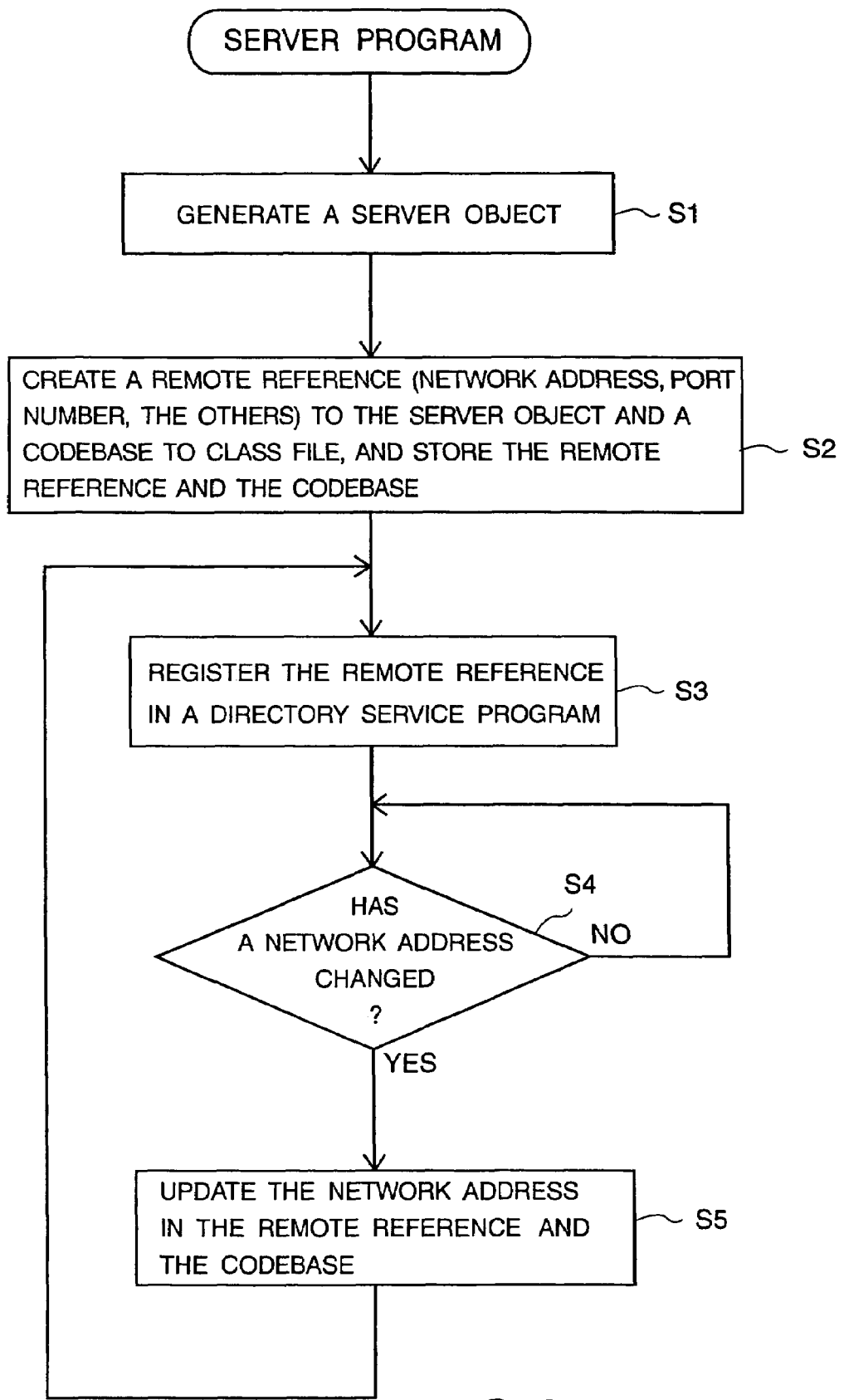
FIG. 3 is a flow chart of processing of the server program according to various embodiments of the present invention.

The Java virtual machine prepares a remote reference control unit in order to utilize RMI. The remote reference control unit controls to create a remote reference for an object in the same Java virtual machine and to receive a remote reference for another object from another Java virtual machine. In this case, assume that a server program to provide some service is created in Java virtual machine S and a client program in another Java virtual machine C accesses the server program. First, the case of no moving (no change in the network address) is explained. FIG. 2 is a block diagram of the virtual machine S on which a server program operates. FIG. 3 is a flow chart of processing of the server program according to the present embodiment. In FIG. 2, the virtual machine S includes a server object 2, a registration control unit 3, a remote reference control unit 4, and a network address acquisition unit 5. In general, the server program of Java includes a plurality of Java objects. In the plurality of Java objects, an object receiving a remote method calling by RMI is included. This object inherits the class "java.rmi.server.RemoteServer". Hereinafter, this object is called server object 2.

The remote reference control unit 4 includes a remote reference update unit 4a and a remote reference memory 4b. The remote reference update unit 4a creates and updates a remote reference for the server object 2, and stores the remote reference in the remote reference memory 4b. Furthermore, the remote reference control unit 4 receives a remote reference to refer an object in another Java virtual machine. The registration control unit 3 registers the remote reference for the server object 2 stored in the remote reference memory 4b to a directory service program in the Java virtual machine D. The network address acquisition unit 5 acquires a network address of a computer 102 from an operating system (For example, Windows (registered trademark of Microsoft Inc.), Linux (registered trademark of Linus Torvalds), and so on. Hereinafter, called "OS".) of the computer 102 when the server object 2 is generated (operated, i.e., class is instanced). The "getLocalHost ( )" method provided by "java.net.InetAddress" class is one example. In JDK (Java Development Kit) 1.1 and JDK 1.2 offered by Sun Microsystems INC., in case of acquiring a network address, the network address is continually preserved until the Java virtual machine is completed. The remote reference update unit 4a writes a network address acquired by the network address acquisition unit 5 in a remote reference.

When the computer 102 is activated and the server object 2 is generated by the Java virtual machine (class is instanced) (S1 in FIG. 3), the remote reference control unit 4 extracts a network address from the network address acquisition unit 5, creates a remote reference for the server object 2, and stores it in the remote reference memory 4b (S2). Next, the registration control unit 3 registers the remote reference for the server object 2 to the directory service program D (S3).

Figure 4:
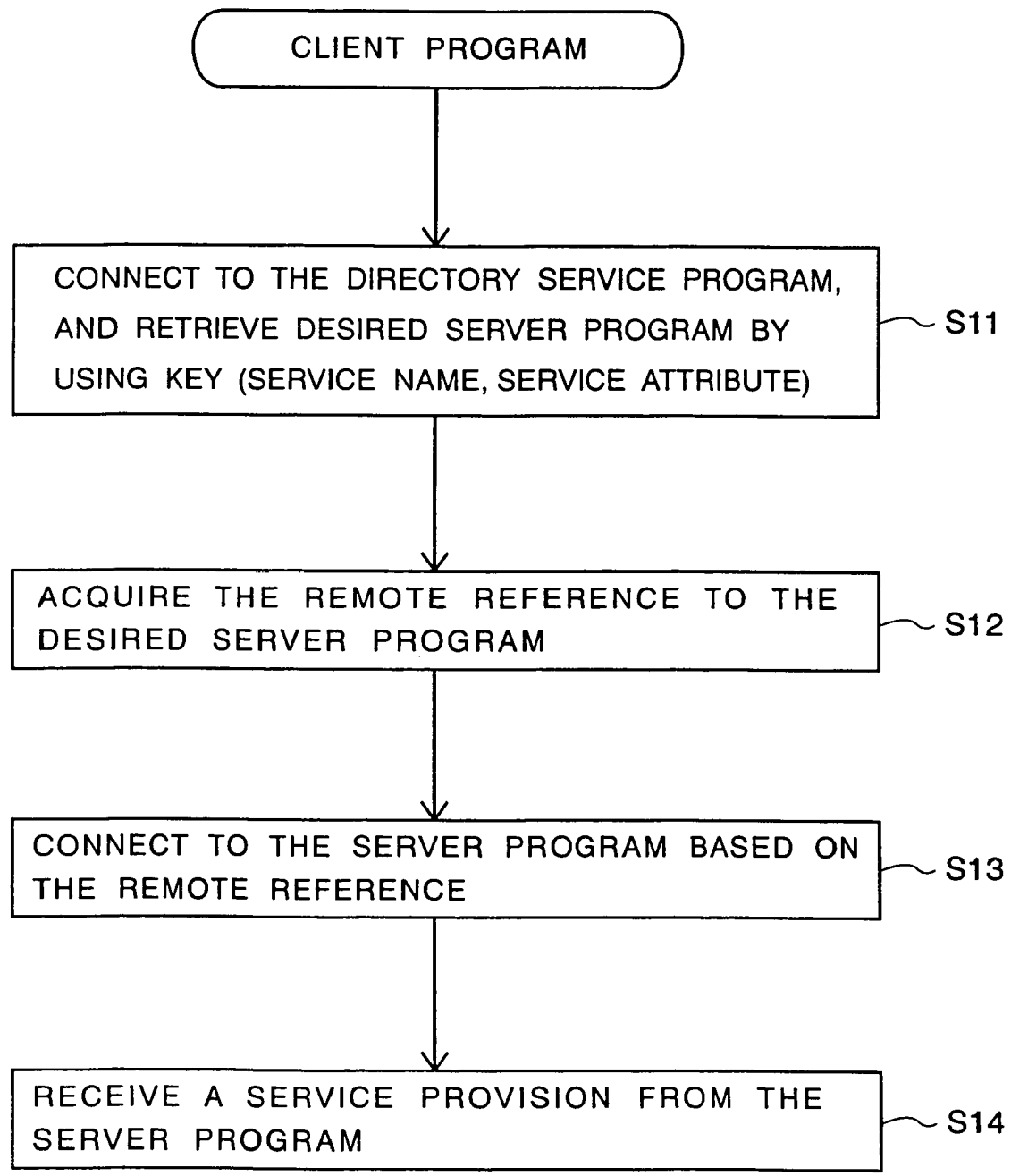
FIG. 4 is a flow chart of processing of the client program.

FIG. 4 is a flow chart of processing of a client program. The client program includes a plurality of Java objects. Hereinafter, they are called client objects. In order to retrieve a server program providing a desired service, the client program connects to the directory service program, and retrieves the desired server program by using a key such as a service name or a service attribute (S11 in FIG. 4). When the client program acquires a remote reference for the desired server program from the directory service program (S12), the client program connects to the desired server program using a network address described in the remote reference (S13), and receives the service provision (S14). As mentioned-above, operation of the server program of S1~S3 in FIG. 3 is the same as in the prior art.

Next, as for the operation of the server program of the present embodiment, the case of the computer's moving (a network address changes) is explained. Assume that the network address of the computer 102 on which the server program is operating is changed. For example, a user carries a mobile computer such as a portable notebook personal computer. While moving or suspending the mobile computer, the user connects the mobile computer to another IP network (Hereinafter, it is called network). Furthermore, in case that a non-movable computer such as a desktop computer is connected by dial-up, when a telephone line is reconnected after disconnect once, another network address is often assigned to the non-movable computer. In this way, assume that the network address of the computer 102 is changed during the server program's operating. In this case, after the IP network of the computer 102 is changed, the server object 2 is not generated again. In a remote reference for the server object 2 stored in the remote reference memory 4b, a network address at the time the server object 2 was generated is continuously preserved. Accordingly, update of the remote reference is necessary based the new network address.

Figure 5:
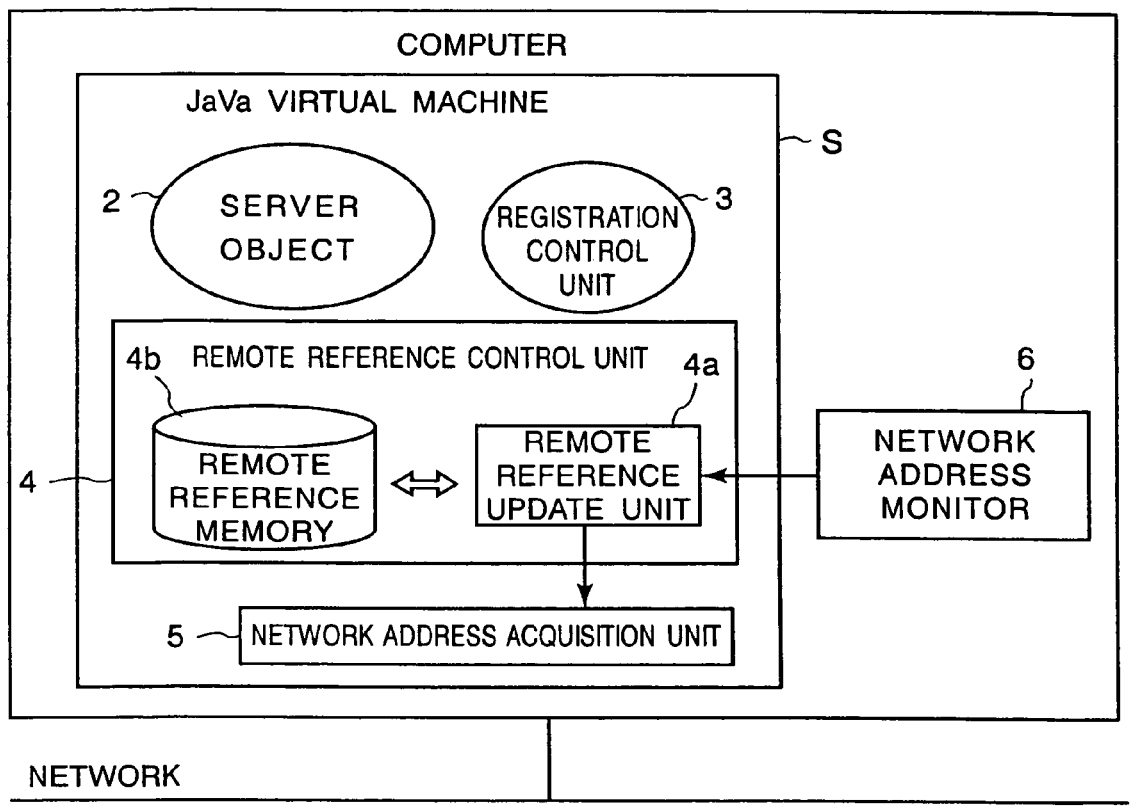
FIG. 5 is a block diagram of the virtual machine executing the server program according to various embodiments of the present invention.

When the network address acquisition unit 5 acquires a network address once, the network address acquisition unit 5 preserves a value of the network address, and informs the value to the remote reference control unit 4 after the network address is changed. Accordingly, the network address acquisition unit 5 must delete the value of previous network address and acquire a new network address in case of calling. In short, when a network address of the computer 102 on which a server program is operating is changed, a mechanism to detect the change in the network address of the computer 102 is necessary to quickly update the remote reference. This mechanism may be prepared by OS managing the address network. As shown in FIG. 5, a program monitoring the address network (network address monitor 6) may always exist outside of the Java virtual machine S. In these cases, a change in the network address from outside of the Java virtual machine S is sent to the remote reference control unit 4 (the remote reference update unit 4a) may be prepared. Thus, a normal communication between processes such as socket may be utilized. Furthermore, as shown in FIG. 6, the network address monitor 7 may exist in the Java virtual machine S.

Figure 7:
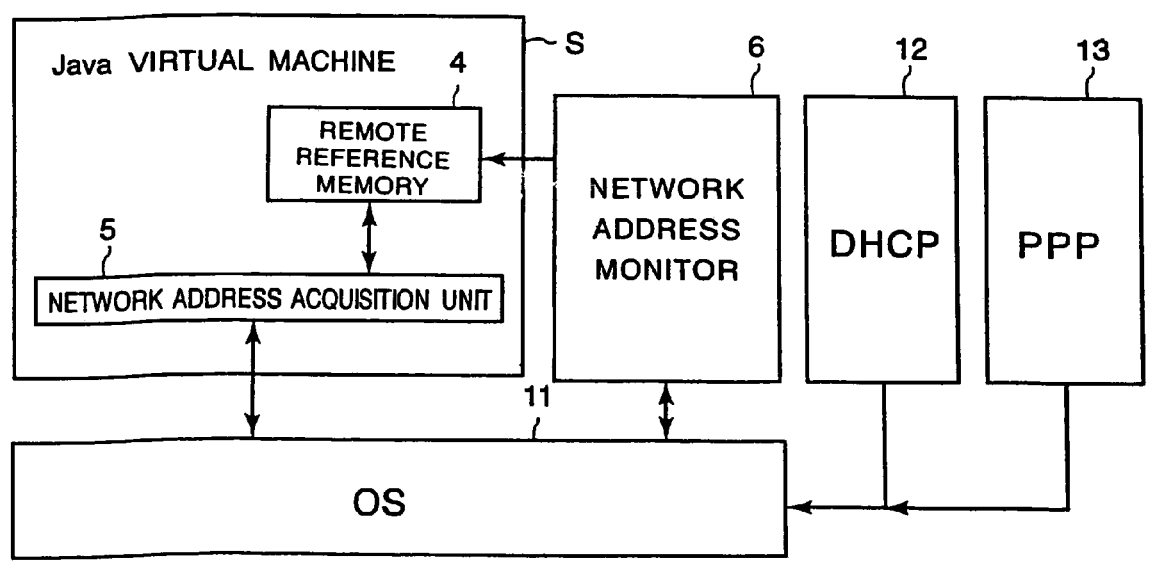
FIG. 7 is a schematic diagram showing a method of detecting changes in a network address.

A function of the network address monitor 6 in FIG. 5 is explained by referring to FIG. 7. The network address is acquired through a Protocol such as DHCP (Dynamic Host Configuration Protocol) 12 or PPP (Point-to-Point Protocol) 13 if necessary, supplied to OS 11 in the computer 102, and preserved in OS 11. The network address monitor 6 periodically reads out a network address stored in OS 11, and compares the network address with a previous network address read out at a previous time. If a present network address is different from the previous network address, the network address monitor 6 informs the remote reference control unit 4 (the remote reference update unit 4a) of the difference using the normal communication such as a socket. On receiving the communication, the remote reference update unit 4a acquires a new network address by activating the network address acquisition unit 5.

Figure 6:
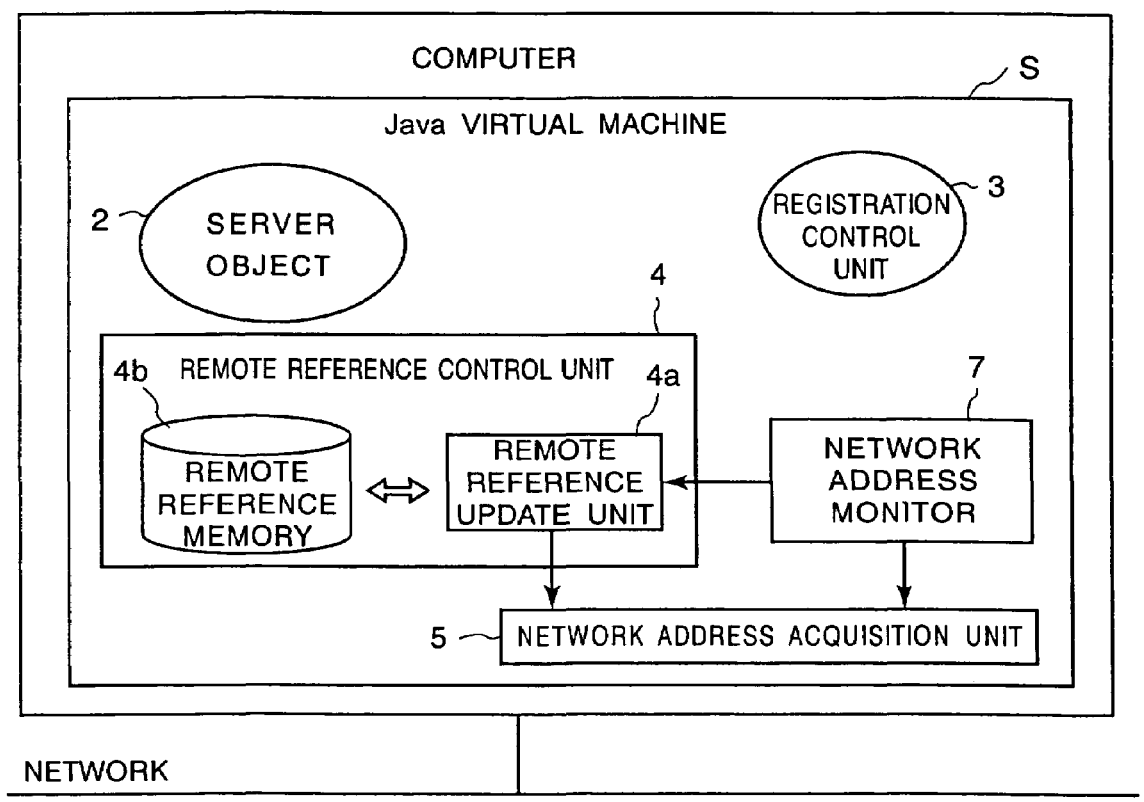
FIG. 6 is a block diagram of another virtual machine executing the server program according to various embodiments of the present invention.
Figure 8:
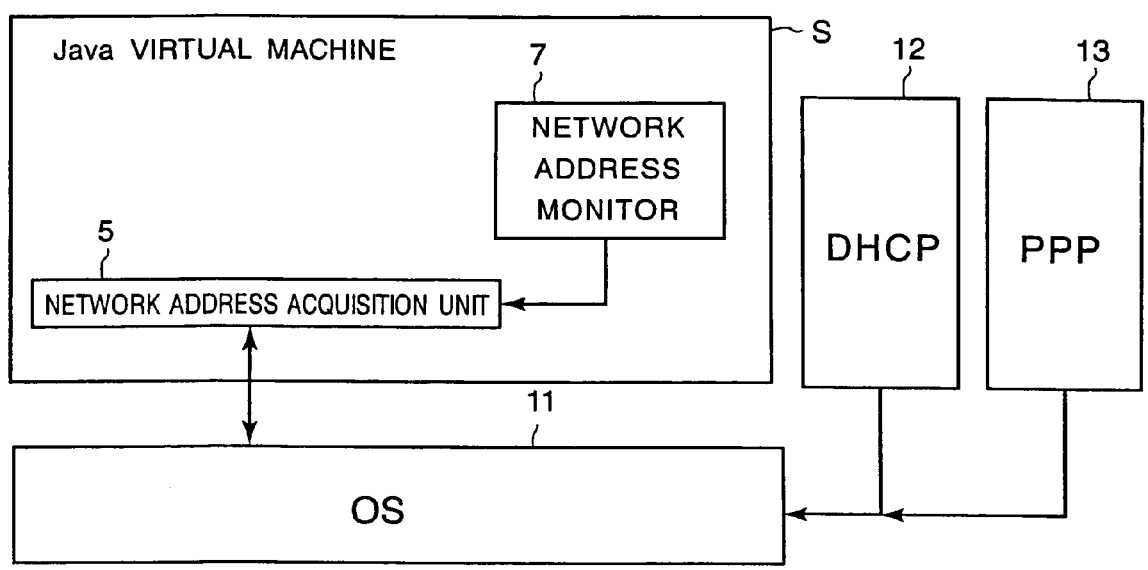
FIG. 8 is a schematic diagram showing another method of detecting changes in a network address.

Furthermore, a function of the network address monitor 7 in FIG. 6 is explained by referring to FIG. 8. In the same way as the above-mentioned explanation, a network address is acquired through a Protocol such as DHCP 12 or PPP 13 loaded on the computer 102, and preserved in OS 11 of the computer 102. The network address monitor 7 periodically calls the network address acquisition unit 5, compares a network address acquired by the network address acquisition unit 5 with a previous network address, and detects whether the network address is changed. In case of detecting a change in the network address, the network address monitor 7 calls a method of the remote reference update unit 4a, and informs the new network address.

Figure 9:
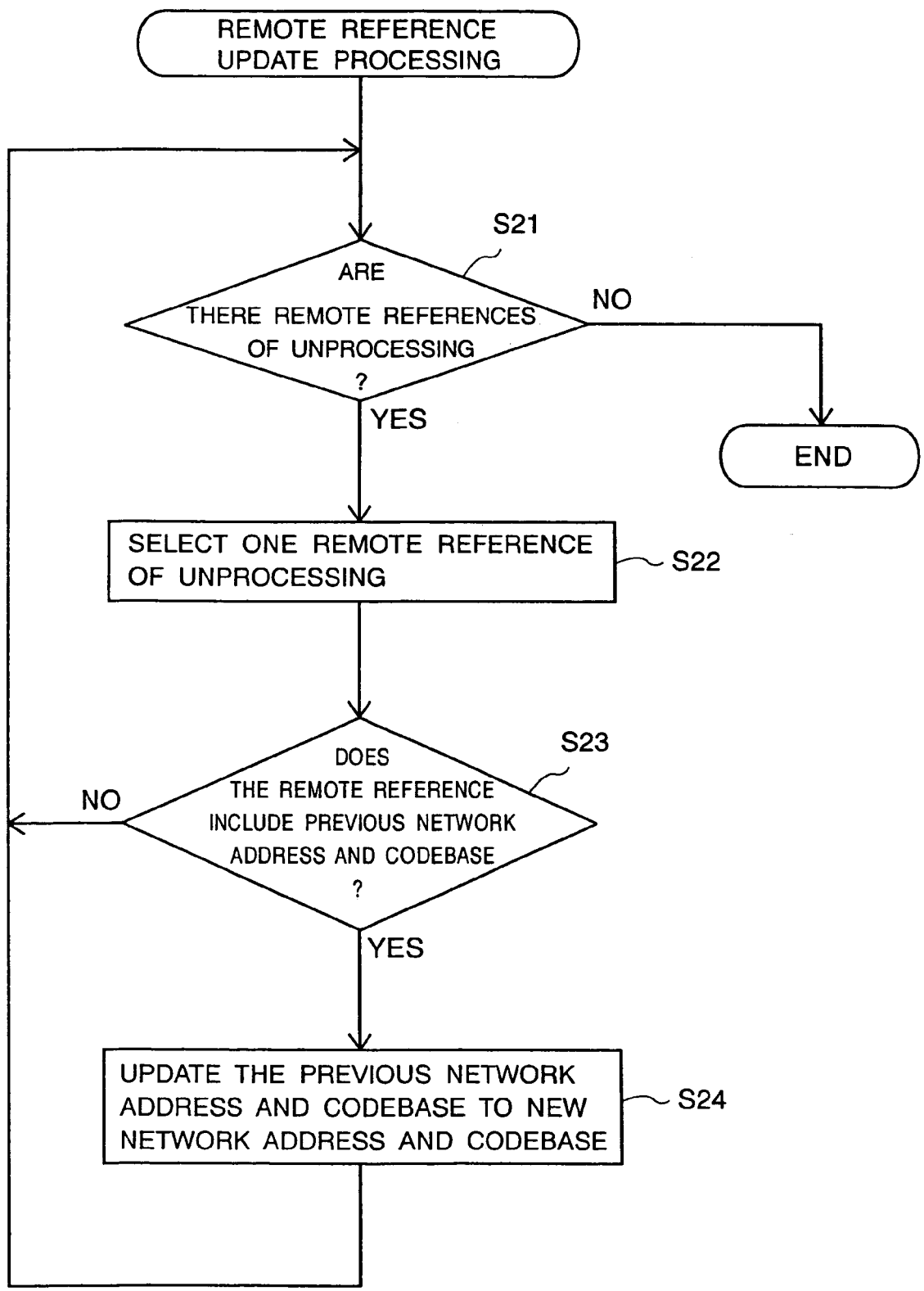
FIG. 9 is a flow chart of a remote reference update processing according to various embodiments of the present invention.

This explanation now returns to FIG. 3. After detecting a change in the network address and acquiring a new network address, the remote reference update unit 4a updates a network address in the remote reference stored in the remote reference memory 4b (S5). The remote reference memory 4b stores a plurality of remote references. The plurality of remote references are divided roughly into references for objects in the same Java virtual machine and references for objects in another Java virtual machine. The remote references to be updated by change of network address are only the references for object in the same Java virtual machine. In this case, a remote reference update processing of the remote reference update unit 4a at S5 in FIG. 3 is explained by referring to a flow chart in FIG. 9. The remote reference update unit 4a selects one remote reference of unprocessing for objects in the same Java virtual machine from the remote references stored in the remote reference memory 4b (S21, S22). If the selected remote reference includes a previous network address before the computer 102 moved (S23), the remote reference update unit 4a updates the previous network address with the new network address (S24).

As a method for detecting changes in the network address, periodical monitoring is not always necessary. The monitor may be executed at each first network access after the computer moves. The remote reference must be updated each time a program of the Java virtual machine S of the computer 102 communicates with another Java virtual machine of another computer. For example, as shown in FIG. 5, when the computer 102 replies to a packet received by a program outside of the Java virtual machine S, the network address monitor 6 checks the network address. If the network address is changed, the network address monitor 6 calls a method of the remote reference update unit 4.

Figure 10:
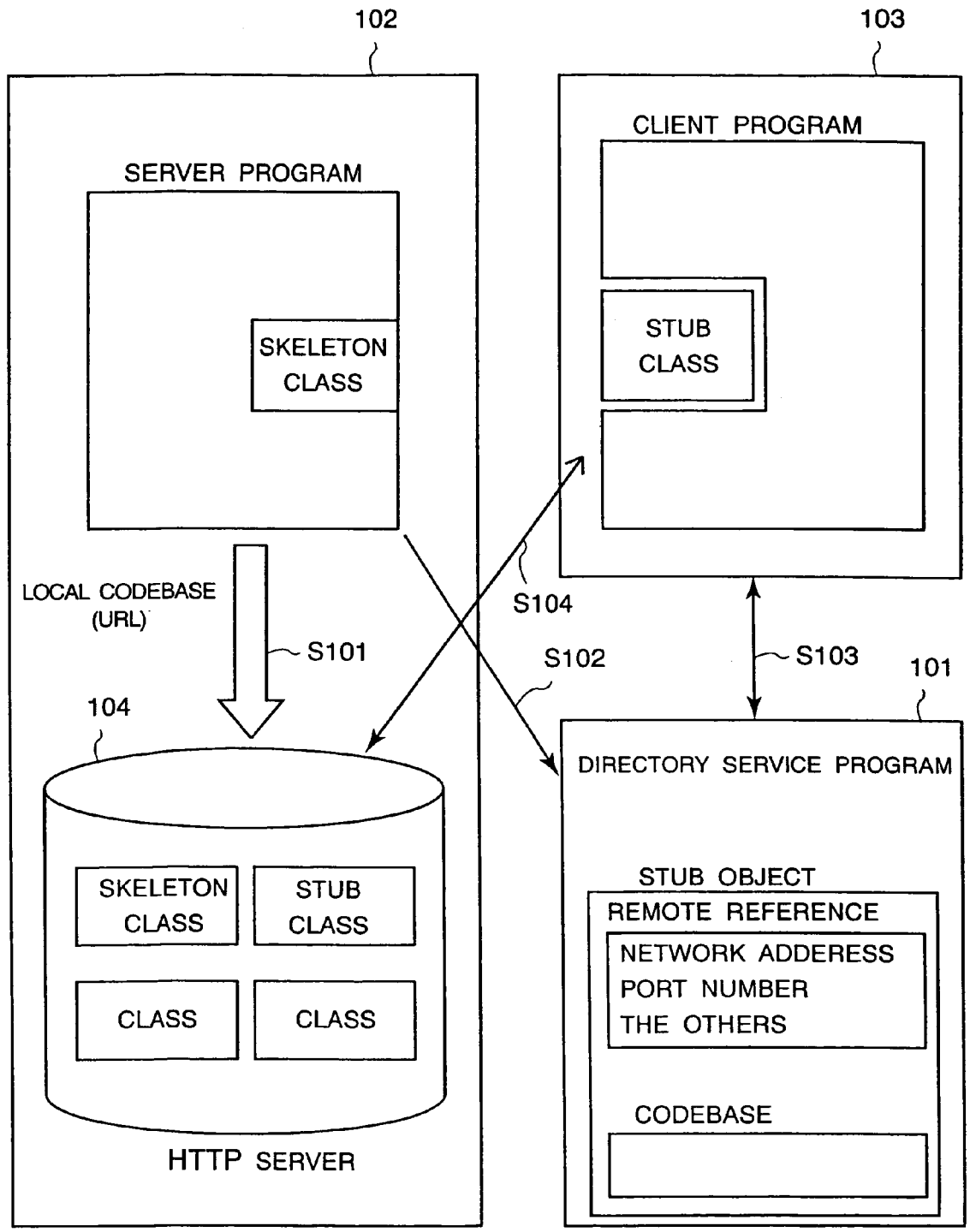
FIG. 10 is a schematic diagram showing a communication concept using RMI of Java.
Figure 11:
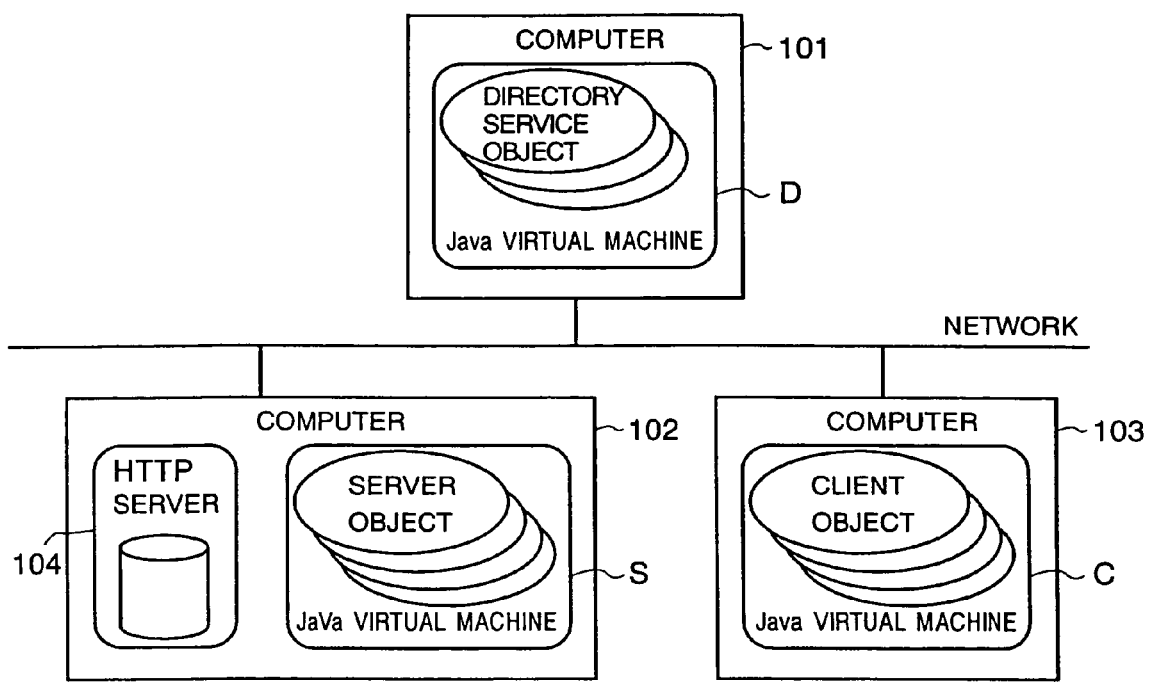
FIG. 11 is another component example of the distributed information processing system.

As mentioned-above, the case of updating the network address in the remote reference by change of the network address was explained. However, actually, accompanying with the change of the network address, object to be updated is not limited to the remote reference only. First, a concept of communication using RMI of Java is explained by referring to FIG. 10. In RMI of Java, when a client program of computer 103 calls a remote method supplied by a server object 2 of the computer 102, a stub class of the server object 2 is necessary. Furthermore, the server program includes a skeleton class corresponding to the stub class. If the stub class of the server object 2 is not included in the computer 103 executing the client program, the client program downloads a file describing the stub class (stub file) from the server object 2 according to an address indicated by a codebase included in a stub object of a directory service program 101. The stub object includes the remote reference and the code base. The stub file exists in the computer 102 operating the server program. Alternatively, the stub file exists in a different computer. As mentioned-above, the former case is affected by a change in the network address accompanying with the computer's moving. When the stub file is provided to the client program of the computer 103, HTTP (Hyper Text Transfer Protocol) is normally utilized. Accordingly, as shown in FIG. 11, in the computer 102 operating the server program, an HTTP server 104 to send a data file by HTTP concurrently operates. In FIG. 10, a stub file of the server object 2 to be provided from the server program of the computer 102 to the client program of communication party is stored in the HTTP server 104 (S101 in FIG. 10). Furthermore, the codebase represents a location address of the stub file of the server object 2. This codebase is added to the stub object when the stub object is sent to the directory service program in order to register (S102 in FIG. 10, S2 in FIG. 3). The client program receives the stub object of desired server program from the directory service program (S103 in FIG. 10), accesses to provision source (HTTP server) of the stub file by referring to the codebase in the stub object, and downloads the stub file (S104 in FIG. 10). After that, the client program executes the operation following from S13 in FIG. 4.

A store location of the stub file of the server object 2 is included in the computer 102. As mentioned-above, if the network address of the computer 102 operating the server program is changed, the remote reference must be updated. In addition to this, the codebase representing a location of the stub file must be updated because the network address of HTTP server 104 providing the stub file is also changed.

In RMI, a class loader for RMI is defined. The class loader for RMI manages the stub class and the skeleton class of RMI, and class supplied as parameter or return value of method of RMI. Concretely, the class loader for RMI retrieves and loads a plurality of class files in order, and stores location addresses from which each class is loaded. In case of sending an object to another Java virtual machine, the class loader annotates a URL representing the location address to the object in order for the receiving side to load the class corresponding to the object. In case of annotating a codebase representing location address of the stub class and the skeleton class, a value in the local codebase managed by the class loader is copied to the codebase (Details are disclosed in the RMI specification). In this local codebase, an initial value is indicated by property at the time of activation.

Figure 12:
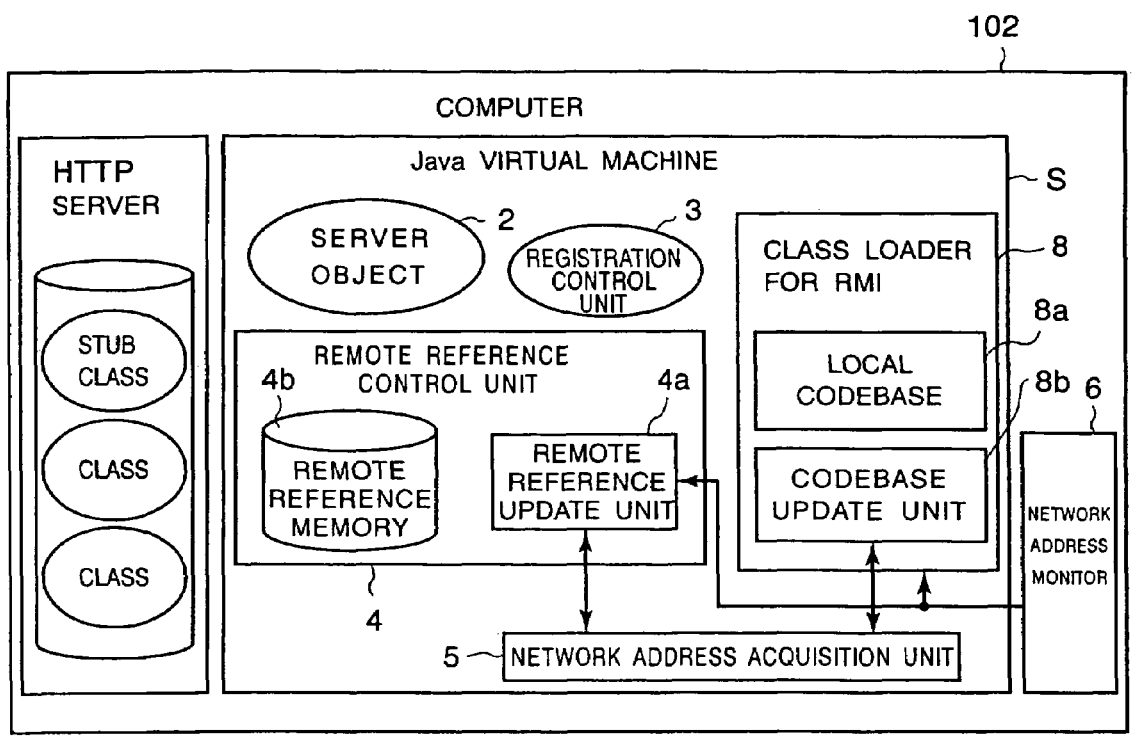
FIG. 12 is a block diagram of another virtual machine executing a server program according to various embodiments of the present invention.

As shown in FIG. 12, a virtual machine S operating a server program includes the class loader 8 for RMI. In FIG. 12, the same sign is assigned to a unit the same as in FIG. 2 and FIG. 5. Hereinafter, different units are explained. In case of a change in the network address of the computer 102, a value in a local codebase 8a managed by the class loader 8 must be updated. Accordingly, if the change in the network address is detected, a codebase update unit 8b is called, and the value representing the computer 102 in the local codebase 8a is updated using the new network address. For example, assume that the network address of the computer 102 is "100. 101. 102. 103" and the codebase is "http://100. 101. 102. 103/codebase/". If the network address of the computer 102 is changed to "200. 201. 202. 203", the codebase is updated as "http://200. 201. 202. 203/codebase/". As shown in FIGS. 7 and 8, detection of changes in a network address is executed outside of the Java virtual machine S (FIG. 7) or inside of the Java virtual machine S (FIG. 8). In FIG. 12, the network address monitor 6 exists outside of the Java virtual machine S.

As mentioned-above, when the network address monitor 6 detects a change in the network address, the network address monitor 6 informs the purport to the remote reference control unit 4 (the remote reference update unit 4a) and the class loader 8 (the code base update unit 8b) of the change using a normal communication between processes such as a socket. On receiving this indication, the remote reference update unit 4a and the codebase update unit 8b acquire the new network address by activating the network address acquisition unit 5. The codebase update unit 8b updates the local codebase 8a using the new network address. At S5 in FIG. 3, the remote reference update unit 4a updates the remote reference using the new network address and updates the local codebase 8a by the codebase update unit 8b. Then, the remote reference updated by the remote reference update unit 4a is registered to a directory service program existing on an IP network of moving destination of the computer 102 (S3 in FIG. 3). This directory service program is not limited to a program operated in the computer 101. In this way, the remote reference update unit 4a updates the network address in the remote reference according to the change in the IP address in cooperation with moving of the computer 102. At a moving destination of the computer 102, updated remote reference and updated codebase are assigned to the stub object, and the stub object is registered to the directory service program. As a result, the server program in the computer 102 can communicate with the new client.

As mentioned-above, in the computer 102 including at least one Java virtual machine S executing the server program, when the network address monitor 6 or 7 detects a change in the IP address of the computer 102, the network address in the remote reference and the codebase are updated. A stub object including updated remote reference and updated codebase is registered again to the directory service program. Accordingly, even after change in the IP address of the computer 102, a client can access to the server program.

In the above-mentioned explanation, the stub file is used as an example. However, the present invention is not limited to this example. For example, when a client sends an argument to a server in order to receive a service from the server, a predetermined class file to interpret the argument is often necessary. In this case, the client sends location data of the class file with the argument to the server. If the IP address of a computer operating the client program is changed in cooperation with the computer's moving, and if the class file exists in the same computer, the client program updates the location data of the class file, and sends the updated location data to the server again.

Furthermore, when the server sends a processing result for the argument to the client, a predetermined class file to interpret the processing result is often necessary. In this case, the server sends location data of the class file with the processing result to the client. If the IP address of a computer operating the server program is changed in cooperation with the computer's moving, and if the class file exists in the same computer, the server program updates the location data of the class file, and sends the updated location data to the client again.

As mentioned-above, in the present invention, in a network connecting a plurality of terminals each including an environment executing a program described by object-oriented language, even if a network address of a particular terminal is suddenly changed, the change of the network address is reflected to the environment, and another terminal can continually access the particular terminal through the network.

A memory can be used to store instructions for performing the process described above. The process may be performed with the aid of a general purpose computer or microprocessor. Such a memory can thus be a CD-ROM, floppy disk, hard disk, magnetic tape, semiconductor memory., and so on.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. An information processing apparatus as a first computer in a system including a plurality of computers each connected to a network, a second computer executing a directory service program, the directory service program including a remote reference representing a network address of each of the plurality of computers, comprising:
   a program processing unit configured to execute a server program described as an object-oriented language executed by a platform independent machine language;
   a monitor unit configured to monitor a change of a network address of the first computer while the server program is operating;
   a network address acquisition unit configured to acquire a new network address of the first computer when said monitor unit detects the change of the network address of the first computer;
   a remote reference control unit configured to create a remote reference of the first computer when the server program is generated in the first computer, the remote reference including the network address and a port number of the first computer, to register the remote reference in the directory service program of the second computer, a third computer referring to the remote reference in the second computer through the network to access the server program, and to update the network address of the remote reference in the second computer by using the new network address;
   an HTTP server configured to store a stub class describing a procedure necessary for the third computer to process the server program received from the first computer; and
   a class loader configured to store a location address of the stub class in a codebase.

2. The information processing apparatus according to claim 1,
   wherein said monitor unit detects the change of the network address of the first computer, and
   wherein said class loader updates the location address in the codebase by using the new network address.

3. The information processing apparatus according to claim 2,
   wherein said remote reference control unit registers a stub object in the directory service program of the second computer, the stub object including the remote reference and the codebase.

4. The information processing apparatus according to claim 3,
   wherein said HTTP server stores a plurality of classes including the stub class; and
   wherein said class loader stores a location address of each of the plurality of classes in the codebase.

5. An information processing method of a first computer in a system including a plurality of computers each connected to a network, a second computer executing a directory service program, the directory service program including a remote reference representing a network address of each of the plurality of computers, comprising:
   executing a server program described as an object-oriented language executed by a platform independent machine language;
   creating a remote reference of the first computer when the server program is generated in the first computer, the remote reference including the network address and a port number of the first computer;
   registering the remote reference in the directory service program of the second computer, a third computer referring to the remote reference in the second computer through the network to access the server program;
   monitoring a chance of a network address of the first computer while the server program is operating;
   acquiring a new network address of the first computer when the change of the network address of the first computer is detected;
   updating the network address of the remote reference in the second computer by using the new network address;
   storing a stub class describing a procedure necessary for the third computer to process the server program received from the first computer; and
   storing a location address of the stub class in a codebase.

6. The information processing method according to claim 5, further comprising:
   when the change of the network address of the first computer is detected, updating the location address in the codebase by using the new network address.

7. The information processing method according to claim 6, further comprising:
   registering a stub object in the directory service program of the second computer, the stub object including the remote reference and the codebase.

8. The information processing method according to claim 7, further comprising:
   storing a plurality of classes including the stub class; and
   storing a location address of each of the plurality of classes in the codebase.

9. A computer program product comprising:
   a computer readable program code embodied in said product for causing a first computer in a system including a plurality of computers each connected to a network, a second computer executing a directory service program, the directory service program including a remote reference representing a network address of each of the plurality of computers, said computer readable program code having:
   a first program code to execute a server program described as an object-oriented language executed by a platform independent machine language;
   a second program code to create a remote reference of the first computer when the server program is generated in the first computer, the remote reference including the network address and a port number of the first computer;
   a third program code to register the remote reference in the directory service program of the second computer, a third computer referring to the remote reference in the second computer through the network to access the server program;
   a fourth program code to monitor a change of a network address of the first computer while the service program is operating;
   a fifth program code to acquire a new network address of the first computer when the change of the network address of the first computer is detected;
   a sixth program code to update the network address of the remote reference in the second computer by using the new network address;
   a seventh program code to store a stub class describing a procedure necessary for the third computer to process the server program received from the first computer; and
   an eighth program code to store a location address of the stub class in a codebase.

* * * * *